2 Sheets. Sheet 2.
G. E. Burt.
Horse Power.
Nº 33,024. Patented Aug. 6, 1861.
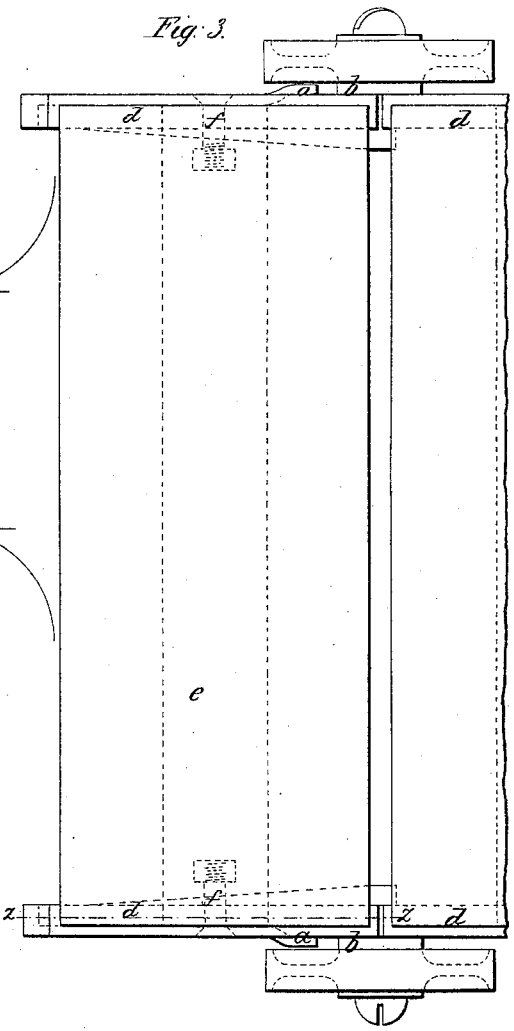
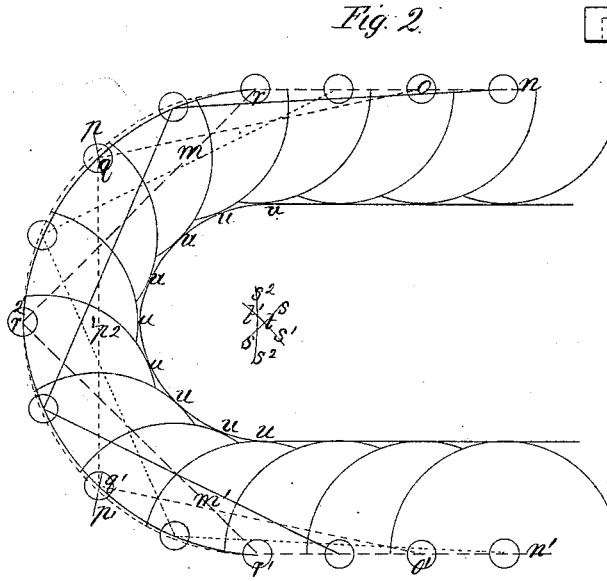
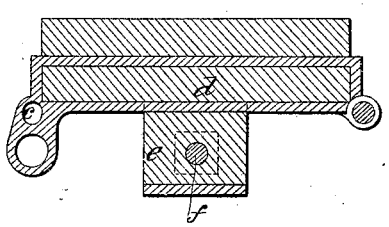
Witnesses;
Henry Mason
James M. Barry
Inventor;
George E. Burt

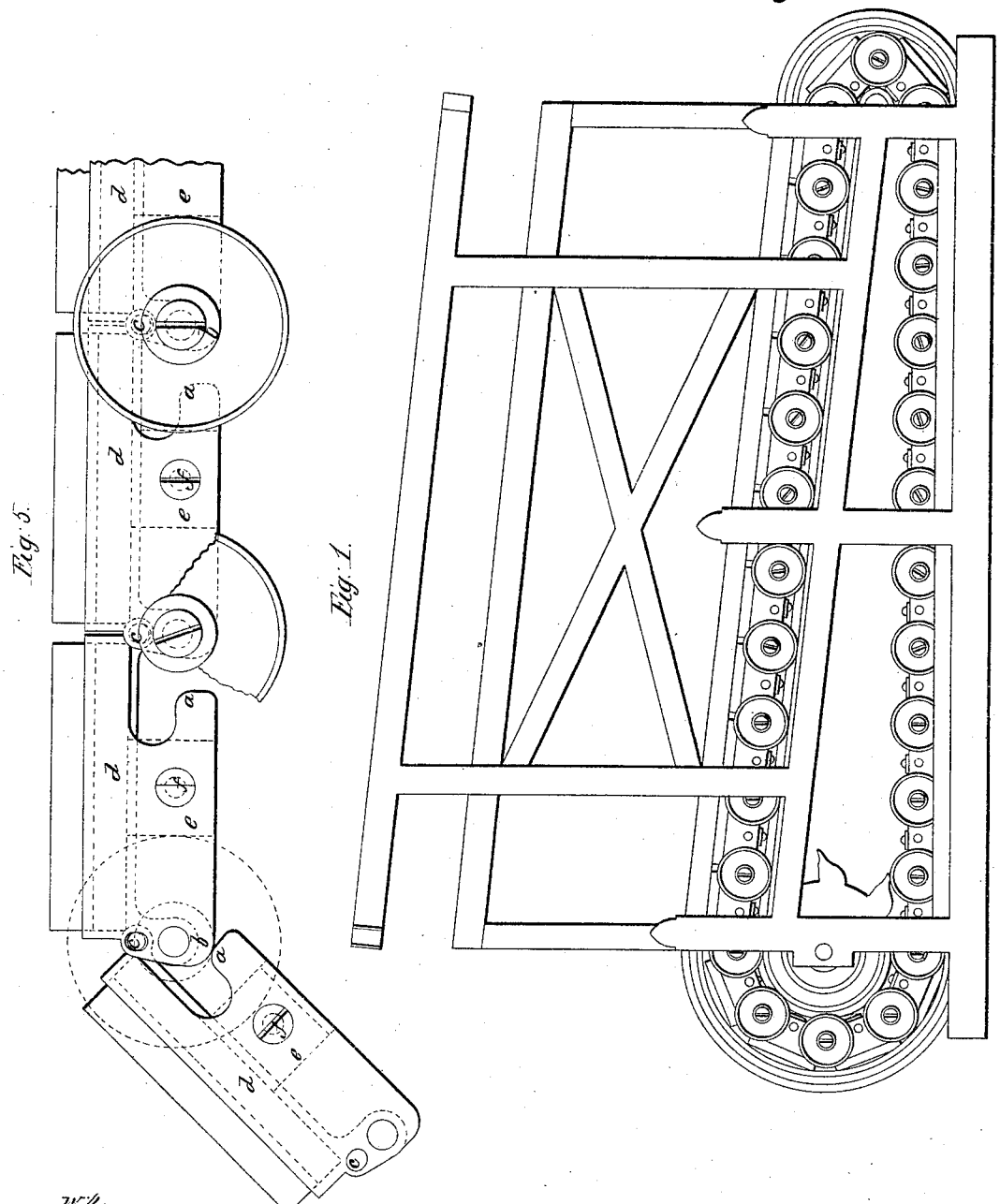

UNITED STATES PATENT OFFICE.

GEORGE E. BURT, OF HARVARD, MASSACHUSETTS.

ENDLESS CHAIN AND TREAD OF HORSE-POWER.

Specification of Letters Patent No. 33,024, dated August 6, 1861.

*To all whom it may concern:*

Be it known that I, GEORGE E. BURT, of Harvard, in the county of Worcester and State of Massachusetts, have invented a new and useful Improvement in Endless-Chain Horse-Powers; and I do hereby declare that the following is a full, clear, and exact description thereof, reference being had to the accompanying drawings, making part of this specification, in which—

Figure 1, is a side elevation of the machine complete. Fig. 2, is a diagram showing the chain in various positions upon the track. Fig. 3, is plan on a larger scale illustrating the construction of the treads and joints. Fig. 4, is a transverse section through one tread, link and safety bar on the red line $z, z$. Fig. 5, is a side elevation of a portion of the chain.

The same letters indicate like parts in all the figures.

It is well known that in all endless chain horse powers, the rotary motion of the wheels is reversed in passing from the upper to the lower track and vice versa; and a considerable wear and loss of power is caused by their peripheries coming in contact with the opposite track, while revolving backward; the whole traction necessary to bring the wheel to a stand still and start it ahead operating as a retarding force to the onward motion of the chain or platform; to overcome this difficulty I form a stud or projection on one end of the link that while the wheel is passing from the straight track over the first quadrant of the end track, the projection shall come in contact with the wheel and act as a brake; arrest its motion and allow it to reach the opposite track in a state of rest.

Fig. 5, in the accompanying drawings represents a side elevation of a portion of a platform chain; one link of which is shown as passing around the end track with the projection $a$, in contact with the hub of the wheel $b$. By examining the chain on the straight part of the track it will be seen that the projection is entirely clear of the wheel. The hole $c$, which receives the joint coupling is made oblong to facilitate the action of the brake and relieve the coupling pin of any strain caused thereby. This oblong hole also permits the chain to adjust itself to any imperfection of the track, caused by imperfect castings, workmanship or leveling up of the machine for use.

It is well known that the wooden treads of horse powers after becoming worn, spring down under the weight of the horse and twist the chain; causing much friction on the wheels and axles; and they sometimes break and peril the safety of the animal on them.

My invention as shown in Figs. 3, 4, and 5, in the accompanying drawings consists in combining the tread with a safety bar by means of recessed links and bolts. $d$, represents the tread fitted into its socket in the link; $c$, represents the safety bar under the tread and attached to the links by the bolts $f$, $f$, this device firmly secures the links, tread and safety bar together; and when the tread becomes worn and thin the safety bar supports the weight of the horse and prevents the twist of the chain and consequent friction. When the treads become worn they may be removed by simply loosening one of the screws $f$.

What I claim as my invention and desire to secure by Letters Patent, is:

1. A stud or projection attached to one end of a link, which shall act as a brake on the wheel of the adjacent link substantially as and for the purposes specified.

2. Connecting the links of endless chain horse powers by pivots working in elliptical holes $c$, as explained, so as to permit vertical but prevent endwise play.

3. Combining the treads with recessed links and safety bars all held firmly together by end bolts substantially as and for the purpose specified.

GEORGE E. BURT.

Witnesses:
 JAMES M. BARRY,
 HENRY MASON.